US008849775B2

(12) United States Patent
Smola et al.

(10) Patent No.: US 8,849,775 B2
(45) Date of Patent: Sep. 30, 2014

(54) CACHING WEB DOCUMENTS IN TWO OR MORE CACHES

(75) Inventors: Alexander Smola, Santa Clara, CA (US); Kostas Tsioutsiouliklis, San Jose, CA (US); Novi Quadrianto, Canberra (AU); Gilbert Leung, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 311 days.

(21) Appl. No.: 12/969,146

(22) Filed: Dec. 15, 2010

(65) Prior Publication Data

US 2012/0158740 A1    Jun. 21, 2012

(51) Int. Cl.
*G06F 7/00* (2006.01)
*G06F 17/00* (2006.01)
*G06F 17/30* (2006.01)

(52) U.S. Cl.
CPC ............................... *G06F 17/30902* (2013.01)
USPC .......................................................... 707/694

(58) Field of Classification Search
None
See application file for complete search history.

(56) References Cited

U.S. PATENT DOCUMENTS

| 5,539,893 | A  | * | 7/1996  | Thompson et al. ........... 711/122 |
| 6,098,064 | A  | * | 8/2000  | Pirolli et al. ......................... 1/1 |
| 6,415,359 | B1 | * | 7/2002  | Kimura et al. ................ 711/137 |
| 6,415,368 | B1 | * | 7/2002  | Glance et al. ................. 711/158 |
| 6,681,298 | B1 | * | 1/2004  | Tso et al. ....................... 711/133 |
| 6,732,237 | B1 | * | 5/2004  | Jacobs et al. .................. 711/119 |
| 8,117,396 | B1 | * | 2/2012  | Fair et al. ...................... 711/133 |
| 8,316,184 | B2 | * | 11/2012 | Fang et al. ..................... 711/118 |
| 2003/0167257 | A1 | * | 9/2003  | de Bonet ........................... 707/1 |
| 2004/0184340 | A1 | * | 9/2004  | Dwarkadas et al. ..... 365/230.03 |
| 2008/0306917 | A1 | * | 12/2008 | Ishii et al. ......................... 707/3 |

OTHER PUBLICATIONS

Paricia Saraiva et al., Rank-preserving two-level caching for scalable search engines, 2001, ACM, SIGIR '01 Proceedings of the 24th annual international ACM SIGIR conference on Research and Development in information retrieval, pp. 51-58.*

Saraiva et al., Rank-Preserving Two-Level Caching for Scalable Search Engines, 2001, ACM, pp. 51-58.*

* cited by examiner

*Primary Examiner* — Taelor Kim

(74) *Attorney, Agent, or Firm* — Pillsbury Winthrop Shaw Pittman LLP

(57) ABSTRACT

A system and method is described herein that cache web documents in two or more caches in an optimized manner. The web documents result from a plurality of queries presented to a web search engine. Each web document has a tier score indicating a position of the web document in the caches. The tier scores are modified in a manner that rearranges the web documents in caches. This rearrangement of the web documents in the caches can advantageously improve the retrieval time for the web documents.

18 Claims, 7 Drawing Sheets

CACHING WEB DOCUMENTS IN TWO OR MORE CACHES

BACKGROUND OF THE INVENTION

1. Field of the Invention

The present invention generally relates to systems and methods for caching web documents.

2. Background

A search engine is an information retrieval system used to locate documents and other information stored on a computer system. Search engines are useful at reducing an amount of time required to find information. One well known type of search engine is a web search engine which searches for documents, such as web pages, on the "World Wide Web." The World Wide Web is formed by a large number of interlinked documents hosted on computer systems that are accessible over the Internet. Other types of search engines include personal search engines, mobile search engines, and enterprise search engines that search on intranets.

Web search engines can provide fast and accurate results to user queries, usually as a list of web documents. The web search engine usually provides the results by identifying the web documents that result from the user query and then locating and retrieving the web documents from storage location(s). In order to provide fast retrieval of web documents from the storage location(s), the web search engine may access a cache that stores most frequently accessed web documents.

Development of a search engine that can index a large and diverse collection of documents, yet that has the ability to return to a user a list of resulting web documents in a timely manner in response to a query has been recognized to be a difficult problem. A user of a search engine typically supplies a short query to the search engine, the query containing only a few terms, such as "hazardous waste" or "country music." The search engine attempts to return a list of relevant documents in a timely manner. Although the search engine may return a list of tens or hundreds of documents, most users are likely to only access the top documents (e.g., 10-100) on the list.

Thus, to be useful to a user, it is desired that a search engine (e.g., a web search engine) would be able to access and/or retrieve, from potentially billions of web documents, the top resulting web documents in a timely manner, in result to any query submitted by the user. A storage system may store the most frequently accessed web documents in a cache that is easily accessible by the web search engine. However, a search engine may receive millions, or even billions, of different user queries that potentially correspond to millions, or even billions, of resulting web documents. It is difficult to efficiently store each resulting web document out of billions of web documents that correspond to results of billions of user queries such that the retrieval time for each web document is minimized Thus, it would be beneficial to efficiently store the billions of resulting web documents that correspond to billions of user queries such that the retrieval time for each web document is minimized.

BRIEF SUMMARY OF THE INVENTION

Techniques are described herein that store web documents in two or more caches in an optimized manner. The web documents result from a plurality of queries presented to a web search engine. Each web document has a tier score indicating a position of the web document in the caches. The tier scores are modified in a manner that rearranges the web documents in the caches. This rearrangement of the web documents in the caches can advantageously improve the retrieval time for the web documents.

In particular, a method for caching web documents in two or more caches is described herein. In accordance with the method, each query of a plurality of queries results in a plurality of web documents. Each of the web documents of the resulting plurality of web documents has a corresponding tier score indicative of a position of the corresponding web document in the two or more caches. For each query of the plurality of queries, tier scores of the resulting plurality of web documents are modified. For instance, a worst web document is determined from the resulting plurality of web documents. The worst web document is positioned in a cache of the two or more caches that has a highest access penalty relative to the access penalties for the other web documents. A tier score associated with the worst web document is modified to indicate a higher priority cache. Tier scores associated with web documents of the resulting plurality of web documents other than the worst web document are modified to indicate a lower priority cache.

A system is also described herein. The system includes two or more caches and a cache placement module. The two or more caches are configured to store a plurality of web documents, where each of the plurality of web documents has an associated tier score indicative of a position of a corresponding web document in the two or more caches. The cache placement module is configured to modify a tier score associated with one or more web documents resulting from each query of a plurality of queries. The cache placement module comprises a document ranking module and a tier score module. The document ranking module is configured to determine a worst web document from the resulting one or more web documents. The worst web document is positioned in a cache of the two or more caches that has a highest access penalty relative to the access penalties for others of the resulting one or more web documents. The tier score module is configured to modify a tier score associated with the worst web document to indicate a higher priority cache. The tier score module is further configured to modify tier scores associated with web documents of the resulting plurality of web documents other than the worst web document to indicate a lower priority cache.

A computer program product is also described herein. The computer program product comprises a computer-readable medium having computer program logic recorded thereon for caching web documents in two or more caches. The two or more caches are configured to store a plurality of web documents, where each of the plurality of web documents has an associated tier score indicative of a position of a corresponding web document in the two or more caches. The computer program logic comprises first means, second means, and third means. The first means is for enabling a processor to modify a tier score associated with one or more web documents resulting from each query of a plurality of queries. The second means is for enabling a processor to determine a worst web document from the resulting one or more web documents. The worst web document is positioned in a cache of the two or more caches that has a highest access penalty relative to the access penalties for others of the web documents. The third means is for enabling a processor to modify a tier score associated with the worst web document to indicate a higher priority cache. The third means further enables a processor to modify tier scores associated with web documents of the resulting plurality of web documents other than the worst web document to indicate a lower priority cache.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
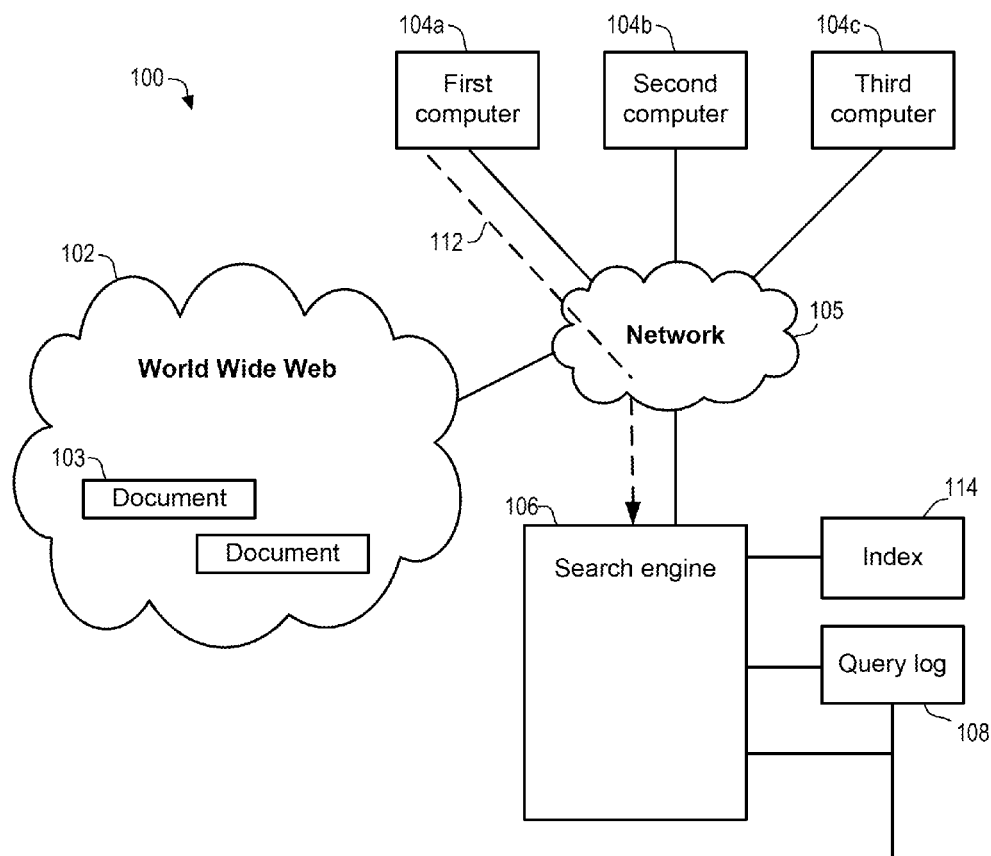
FIG. 1 is a block diagram of an information retrieval system in which an embodiment may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Techniques are described herein for optimizing the caching of a plurality of web documents in two or more caches. An optimal arrangement of the plurality of web documents in the two or more caches can advantageously improve the retrieval time for web documents that are results of user queries, thus improving the experience of a user conducting a web search using the web search engine.

Embodiments may be implemented in variety of environments. For instance, FIG. 1 is a block diagram of an information retrieval system 100 in which an embodiment may be implemented. System 100 is described herein for illustrative purposes only, and it is noted that embodiments may be implemented in alternative environments. As shown in FIG. 1, system 100 includes a search engine 106. One or more computers, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104a-104c can retrieve web documents from entities over network 105. In embodiments where network 105 includes the Internet, a collection of web documents, including a document 103, which form a portion of World Wide Web 102, are available for retrieval by computers 104a-104c through network 105. On the Internet, web documents may be identified/located by a uniform resource locator (URL), such as http://www.yahoo.com, and/or by other mechanisms. Computers 104a-104c can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as web documents of World Wide Web 102. A user of computer 104a who desires to retrieve one or more web documents relevant to a particular topic, but does not know the identifier/location of such a web document, may submit a query 112 to search engine 106 through network 105. Search engine 106 receives query 112, and analyzes index 114 to find web documents relevant to query 112. For example, search engine 106 may identify a set of web documents indexed by index 114 that include terms of query 112. The set of web documents may include any number of web documents, including tens, hundreds, thousands, millions, or even billions of web documents. Search engine 106 may use a ranking or relevance function to rank web documents of the retrieved set of web documents in an order of relevance to the user. Web documents of the set determined to most likely be relevant may be provided at the top of a list of the returned web documents in an attempt to avoid the user having to parse through the entire set of web documents. The list of the returned web documents may be provided in the context of a web document termed a "search results page."

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Bing.com™ (at http://www.bing.com), Ask.com™ (at http://www.ask.com), and Google™ (at http://www.google.com).

Figure 2:
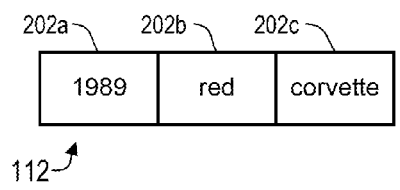
FIG. 2 shows an example query that may be submitted by a user to a search engine.

FIG. 2 shows an example query 112 that may be submitted by a user of one of computers 104a-104c of FIG. 1 to search engine 106. As shown in FIG. 2, query 112 includes one or more terms, such as first term 202a, second term 202b and third term 202c. Any number of terms may be present in a query. As shown in FIG. 2, terms 202a, 202b and 202c of query 112 are "1989," "red," and "corvette," respectively. Search engine 106 applies these terms 202a-202c to index 114 to retrieve a web document locator, such as a URL, for one or more indexed web documents that match "1989," "red," and "corvette," and may order the list of web documents according to a ranking.

As also shown in FIG. 1, search engine 106 may generate a query log 108. Query log 108 is a record of searches that are made using search engine 106. Query log 108 may include a list of queries, by listing query terms (e.g., terms 202a-202c of query 112) along with further information/attributes for each query, such as a list of web documents resulting from the query, a list/indication of web documents in the list that were selected/clicked on ("clicked") by a user reviewing the list, a ranking of clicked web documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As further shown in FIG. 1, system 100 also includes tiered storage module 116 coupled to search engine 106. Tiered storage module 116 includes a cache placement module 118 and caches 120. Cache placement module 118 is configured to optimize arrangement of a plurality of web documents in caches 120. For example, cache placement module 118 may optimize the arrangement of the set of web documents (e.g., the plurality of web documents) indexed by index 114 that includes terms of query 112. In one implementation, cache placement module 118 may optimize the arrangement of the plurality of web documents off-line, e.g., while search engine 106 is either off-line. In another implementation, cache placement module 118 may optimize the arrangement of the web documents by generating and optimizing a copy of tiered storage module 116. By using the copy of tiered storage module 116, search engine 106 may continue to access tiered storage module 116 while the arrangement of the web documents in the copy of tiered storage module 116 is optimized by cache placement module 118. Once the arrangement of the web documents in the copy of tiered storage module 116 is optimized, the optimized copy of tiered storage module 116 and tiered storage module 116 may be swapped, thus substantially eliminating, or at least minimizing, any downtime of search engine 106. Once the arrangement of the plurality of web documents in caches 120 is optimized, search engine 106 may be able to access resulting web documents (e.g., 10-100 or more top resulting web documents) that are results of each of the queries more efficiently and in a timelier manner.

Thus, by optimizing the arrangement of the plurality of web documents in caches 120, search engine 106 can advantageously improve the time it takes to access tiered storage module 116 to timely retrieve resulting web documents that are results of one or more queries to search engine 106. Furthermore, by efficiently optimizing the arrangement of the plurality of web documents in caches 120, the optimization process itself can be timely performed. For example, cache placement module 118 may efficiently optimize the arrangement of most, if not all, of the web documents and queries that may be used by web search engine 106. The manner in which cache placement module 118 optimizes the arrangement of the plurality of web documents in caches 120 will be described in more detail below.

Tiered storage module 116, including cache placement module 118 may be implemented in hardware, software, firmware, or any combination thereof. For example, tiered storage module 116 may include software/firmware that executes in one or more processors of one or more computer systems, such as one or more servers. In embodiments, tiered storage module 116 may be implemented in a different, or in the same computer system(s) that implement search engine 106. When implemented in different computer systems, tiered storage module 116, including cache placement module 118, may communicate with search engine 106 via any suitable communication link, including network 105 or other network or communication link. Furthermore, tiered storage module 116 may include one or more storage devices for storing caches 120, including one or more memory devices, hard disc drives, optical disc drives, and/or other types of storage devices.

B. Embodiments for Caching Web Documents in Two or More Caches

Figure 3:
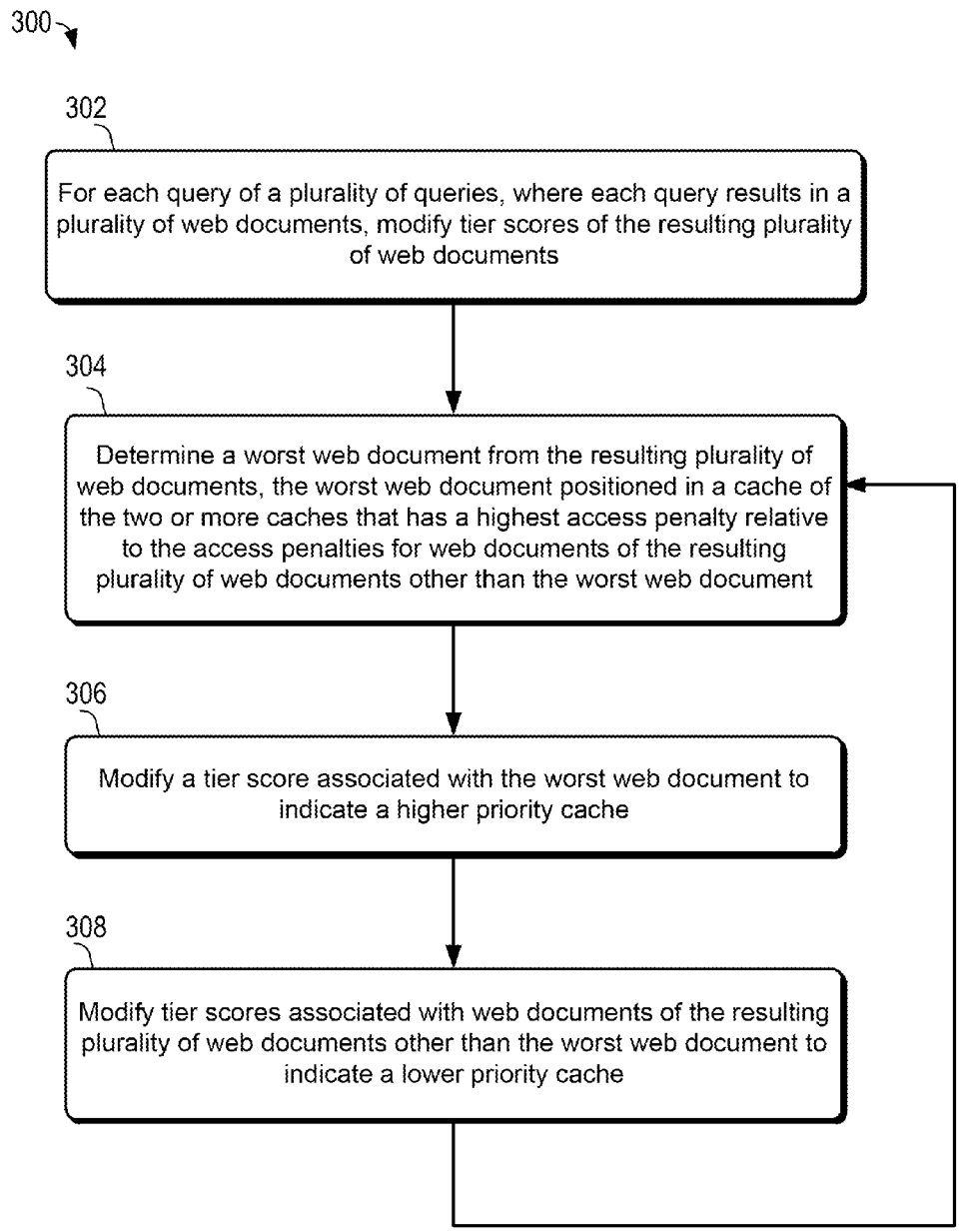
FIG. 3 depicts a flowchart of a method for caching web documents in two or more caches in accordance with an embodiment.

In embodiments, web documents may be cached in a more efficient manner in various ways. For instance, FIG. 3 depicts a flowchart 300 of a method for caching web documents in two or more caches in accordance with an embodiment. The method of flowchart 300 will be described in reference to elements of system 100. However, it is noted that the method is not limited to that implementation. Further structural and operational embodiments will be apparent to persons skilled in the relevant art(s) based on the following description of flowchart 300. Also, the method of flowchart 300 may be modified by those skilled in the art in order to derive alternative embodiment(s). Also, the steps may occur in a different order than shown, some steps may be performed concurrently, some steps may be combined with other steps, and/or some steps may be absent, as desired.

As shown in FIG. 3, flowchart 300 begins at step 302. In step 302, for each query of a plurality of queries, where each query results in a plurality of web documents, tier scores of the resulting plurality of web documents are modified. For instance, in an embodiment, cache placement module 118 modifies tier scores of a resulting plurality of web documents for each query of a plurality of queries, where each query results in a plurality of web documents. Each of the web documents of the resulting plurality of web documents may have a corresponding tier score indicative of a position of the corresponding web document in caches 120. Each query may be submitted by a user to search engine 106. The user may be, for example, any of the users of computers 104a-104c and the queries may be submitted from any one of computers 104a-104c to search engine 106 via network 105 in a manner previously described.

Figure 4:
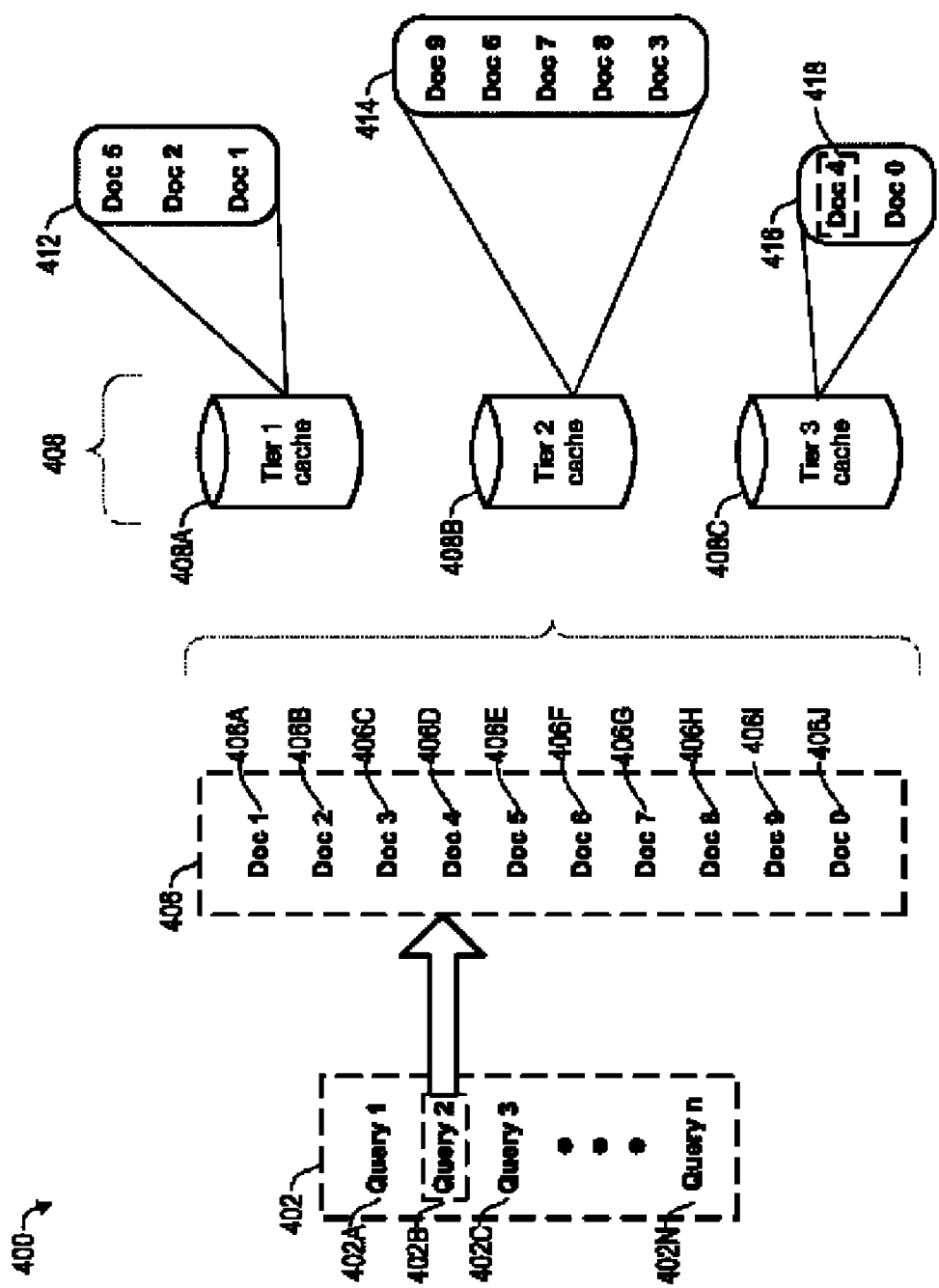
FIG. 4 is a block diagram that depicts a system for caching web documents in two or more caches in accordance with an embodiment.

For instance, FIG. 4 shows a block diagram of a web document caching system 400, according to an example embodiment. In FIG. 4, a plurality of queries 402A-402N is processed by a search engine (e.g., search engine 106 of FIG. 1). For instance, a query 402B may be submitted by a user to search engine 106. Search engine 106 may return a plurality of web documents, referred to herein as resulting plurality of web documents 406, or simply resulting web documents 406. In one implementation, resulting web documents 406 may include ten web documents, such as web documents 406A-406J. In other implementations, resulting web documents 406 may include additional or fewer web documents.

It is noted that provision of each of queries 402A-402N to web search engine 106 may result in a non-exclusive plurality of resulting web documents. In other words, another query 402 (e.g., query 402C) may result in a second plurality of resulting web documents that includes one or more duplicate web documents to resulting web documents 406 resulting from query 402B. When considering a large number of queries, such as a billion or more queries, the resulting pluralities of web documents may contain a large number of duplicate web documents, i.e., web documents that are included in the results to more than one query of plurality of queries 402A-402N.

In an embodiment, resulting web documents 406 are stored in caches 120, such as caches 408. Caches 408 may include multiple caches designated to reside in tiers, such as a tier 1 cache 408A, a tier 2 cache 408B, and a tier 3 cache 408C. Furthermore, the tiers are ranked or ordered according to access time. For instance, tier 1 cache 408A may have a lower access time than tier 2 cache 408B, tier 2 cache 408B has a lower access time than tier 3 cache 408C, etc. Any number of tiers may be present. Furthermore, caches 408 may be accessed either sequentially or in parallel. It will be apparent to persons skilled in the relevant art(s) that the example tier caches and their relative access times described herein may include additional or fewer cache tiers that have different relative access times than what is described herein, and that the example number and relative access times of tier caches are provided for illustrative purposes only and are not intended to be limiting.

In embodiments, web documents may be stored in caches 408. For instance, hundreds, thousands, or even greater numbers of web documents may be stored in caches 408. Furthermore, because caches 408 have different access times, it is desirable for web documents that are accessed more frequently (e.g., appear in the results of more queries than do other web documents) to be stored in the tiers with lower access times. However, each tier of caches 408 has space for a limited number of web documents. As such, it is desirable to optimize the storage of web documents in caches 408 such that more frequently accessed web documents tend to reside in lower access time tiers, and less frequently accessed web documents tend to reside in higher access time tiers.

In one example, resulting web documents 406 may include ten web documents stored in caches 408. For instance, tier 1 cache 408A may store three web documents 412 of resulting web documents 406, tier 2 cache 408B may store five web documents 414 of resulting web documents 406, and tier 3 cache 408C may store a last two web documents 416 of resulting web documents 406. Tiers 1-3 caches 408A-408C may further include additional number of web documents that were not included in resulting web documents 406. If the access time to tier 1 cache 408A is lower than the access time to tier 2, and the access time to tier 3 cache is higher than the access time to other tier 2 cache 408B, access by search engine 106 to either one of web documents 416 in tier 3 cache 408C may be a bottleneck in the web document retrieval process. In other words, search engine 106 may be able to provide resulting web documents 406 in response to query 402B only as fast as the provision of web documents 416.

Thus, in step 302 cache placement module 118 modifies tier scores of resulting web documents 406 for each query of plurality of queries 402, such as where query 402B results in resulting web documents 406. Cache placement module 118 modifies tier scores of resulting web documents 406 such that position of resulting web documents 406 is optimized for retrieval by search engine 106 from caches 408. For example, cache placement module 118 may modify tier scores of last two web documents 416 such that position of web documents 416 is moved from tier 3 cache 408C to tier 2 cache 408B or even to tier 1 cache 408A. As a result, the position of resulting web documents 406 is better optimized for retrieval by search engine 106 from caches 408. Of course, to move web documents 416 to lower access time caches 408A and 408B, two other web documents in caches 408A and 408B may need to be displaced to higher access time caches.

In step 304, a worst web document is determined from the resulting plurality of web documents, where the worst web document is positioned in a cache of the two or more caches that has a highest access penalty relative to the access penalties for web documents of the resulting plurality of web documents other than the worst web document. For instance, in an embodiment, cache placement module 118 determines a worst web document from the resulting plurality of web documents. In one embodiment, the worst web document is positioned in one of caches 120 that has a highest access penalty relative to the access penalties for web documents of the resulting plurality of web documents other than the worst web document.

In one embodiment, the worst web document is a web document from resulting web documents 406 that has an associated tier score indicative of a lower priority cache, i.e., a cache with a higher access penalty relative to access penalties for higher priority caches with lower access penalties. With reference to FIG. 4, a worst web document may be one of web documents 416 stored in tier 3 cache 408C, either web document 4 or web document 0. For example, cache placement module 118 may determine that web document 4 is a worst web document 418 if the web document 4 has a lower tier score between two web documents 416 stored in tier 3 cache 408C, and a lower tier score is indicative of a corresponding web document being stored in a lower priority cache, i.e., in a cache with a higher access penalty relative to access penalties for higher priority caches. In another embodiment, cache placement module 118 may determine that both web document 4 and web document 0 are the worst web documents since both of two web documents 416 stored in tier 3 cache 408C slow the retrieval by web search engine 106 of all of resulting web documents 406.

For example, with reference to FIG. 4, cache placement module 118 determines an access penalty for each resulting web document 406A-406J. Next, cache placement module 118 determines worst web document 418 that has a highest access penalty from resulting web documents 406. For example, cache placement module 118 may determine that one (i.e., web document 4), or both (i.e., web document 0 and web document 4), of resulting web documents 416 stored in tier 3 cache 408C have the highest access penalty from resulting web documents 406.

In step 306, a tier score associated with the worst web document is modified to indicate a higher priority cache. For instance, in an embodiment, cache placement module 118 may modify a tier score associated with a worst web document to indicate a higher priority cache, where a higher priority cache has a lower access penalty relative to an access penalty for a lower priority cache. Further to the example of FIG. 4, cache placement module 118 may modify a tier score associated with worst web document 418 (web document 4 of two web documents 416) to indicate a higher priority cache. However in another example, cache placement module 118 may modify tier scores associated with both web document 4 and web document 0 of two web documents 416 to indicate a higher priority cache for each of two web documents 416.

In one embodiment, cache placement module 118 defers the modification of the tier score associated with the worst web document until the worst web document is accessed again at a later time. In another embodiment, cache placement module 118 immediately modifies the tier score. In an embodiment, cache placement module may modify the tier score associated with worst web document 418 to indicate a higher priority cache by an amount that is allowed by a learning rate, as described in further detail further below.

In step 308, tier scores associated with web documents of the resulting plurality of web documents other than the worst web document are modified to indicate a lower priority cache. For instance, cache placement module 118 may be configured to modify tier scores of the others of resulting web documents 406, where a lower priority cache has a higher access penalty relative to an access penalty for a higher priority cache. Further to the example of FIG. 4, cache placement module 118 may modify tier scores associated with resulting web documents 406 other than worst web document 418 to indicate a lower priority cache. In one implementation, cache placement module 118 modifies the tier scores associated with resulting web documents 406 other than worst web document 418 only by an amount that is allowed by a learning rate (as described further below).

In one embodiment, the tier scores for all of resulting web documents 406 other than worst web document 418 (e.g., resulting web documents 412 and 414 stored in caches 408A and 408B respectively) are lowered by the same amount, regardless of cache tier 408 storing the respective resulting web documents. In another embodiment, the tier scores for resulting web documents 406 other than worst web document 418 are lowered by a different amount depending on cache tier 408 storing the respective resulting web documents (e.g., tier scores for web documents 412 stored in cache 408A are lowered by a different amount from web documents 414 stored in cache 408B). In yet another embodiment, the tier scores for each of resulting web documents 406 other than worst web document 418 are lowered by a different amount, regardless of the particular cache tier 408 storing the respective resulting web documents. Furthermore, if web document 0 is not determined to be a worst web document in addition to web document 4, then tier score for web document 0 (stored in same cache 408C as worst web document 418), may be lowered in each of the above embodiments as a resulting web document other than worst web document. However, if web document 0 is determined to be a worst web document in addition to web document 4, then the tier score for web document 0 may not be lowered in step 308. Instead, the tier score for web document 0 may be modified in step 306, as described above.

In one implementation, steps 304 through steps 308 may be repeated by cache placement module 118 for each query of a plurality of queries, where each query results in a plurality of web documents. With reference to FIG. 4, cache placement module 118 may repeat steps 304 through step 308 for each query 402A-402N of plurality of queries 402. Each repeating of steps 304 through step 308 for each query 402A-402N of plurality of queries 402 may be referred to as an iteration. In one implementation, cache placement module 118 may perform MaxIter iterations (e.g., variable MaxIter of an optimizing algorithm described below) of repeating of steps 304 through step 308 for each query 402A-402N of plurality of queries 402.

Cache placement module 118 may perform up to MaxIter iterations in order to allow the tier scores of each of the plurality of web documents to settle to a stable value. For example, cache placement module 118 may change the tier score of worst web document 418 and/or tier scores associated with resulting web documents 406 other than worst web document 418 only by an amount that is allowed by a learning rate. In one implementation, the learning rate is proportional to a counter variable, e.g., a counter variable n of the optimizing algorithm described below. For example, during a first iteration the learning rate may have an initial value for a learning rate (e.g., such as assigned by cache placement module). In accordance with this example, during the next iteration the learning rate may have a smaller value (e.g., such as calculated by a formula that relates the learning rate to the current iteration). Thus, the value of the learning rate for the last iteration n may be the smallest of all of the previous iterations. As a result, cache placement module 118 may be configured to change the tier scores for the plurality of web documents by a largest amount during the first iteration. Analogously, cache placement module 118 may be configured to change the tier scores for the plurality of web documents by a smallest amount during the last iteration of MaxIter iterations. In other embodiments, a learning rate may be configured in other ways.

Referring to FIG. 1, cache placement module 118, and thus tiered storage module 116, may optimize the arrangement of the plurality of web documents in caches 120 off-line, such as by performing MaxIter iterations of repeating of steps 304 through step 308 for each query 402A-402N of plurality of queries 402. As a result, the plurality of web documents (i.e., potentially billions of web documents accessed by web search engine 106) may be optimally arranged in caches 120 to minimize the average access time (e.g., retrieval time of each resulting web document) for resulting web documents for each query of the plurality of queries.

Furthermore, the actual optimization process of arranging the plurality of web documents in accordance with flowchart 300 may be also optimized for the very large numbers of both queries (e.g., in billions) as well as web documents (e.g., also in billions). A conventional approach that simply re-arranges each resulting web document to a higher tiered cache would either be computationally and/or time ineffective, or may result in all of the web documents being moved to one or more highest caches (an undesirable result). Instead, the optimization process of arranging the plurality of documents in accordance with flowchart 300 can be carried out for very large numbers of both queries and web documents.

In an example embodiment, one or more steps of flowchart 300 may be implemented using the following optimizing algorithm. It will be apparent to persons skilled in the relevant art(s) that the example optimizing algorithm described herein may include additional or fewer steps than what is described herein, and that the example order of steps is provided for illustrative purposes only and is not intended to be limiting.

[a]  Initialize all x = 0
[b]  Initialize n = 100
[c]  for i = 1 to MaxIter do
[d]    for all q $\in$ Q do -continued

[e] $\eta = \dfrac{1}{\sqrt{n}}$

[f]     n ← n+1
[g]     Update x ← x − η ∂$_x$l$_q$(x)
[h]     Project x to [0, k − 1]$^D$ via x$_d$ ← max (0, min (k − 1, x$_d$))

In step [a] of the optimizing algorithm, a value of x is initialized to 0. In one embodiment, x is an index variable used by the optimizing algorithm, and it may be used as a tier score associated with each web document.

In step [b] of the optimizing algorithm, a value of n is initialized to 100. In one embodiment, n is a counter variable used by the optimizing algorithm, and it may be used to calculate a value of the learning rate (η). For example, counter variable n may count updates made by the optimizing algorithm. It will be apparent to persons skilled in the relevant art(s) that the example value and use of counter variable n is provided for illustrative purposes only and is not intended to be limiting.

In step [c] of the optimizing algorithm, an iteration loop is initialized. In one embodiment, the body of the iteration loop (e.g., steps [d]-[h]) are performed MaxIter times, where MaxIter is a variable that may be dynamically generated by cache placement module 118, or it may be input by an administrator of web search engine 106. In general, the larger the value of MaxIter, the longer it will take for the optimizing algorithm to finish. However, the optimizing algorithm may produce more accurate and/or precise results when using a larger value of MaxIter than when using a smaller value of MaxIter.

In step [d] of the optimizing algorithm, another iteration loop (referred to as a query iteration loop) is initialized. In one embodiment, the body of the query iteration loop (e.g., steps [e]-[h]) is performed for each query q (such as each query 402A-402N) of all the queries Q (such as plurality of queries 402).

In step [e] of the optimizing algorithm, the value of the learning rate (η) is calculated using the counter variable n. The learning rate indicates a maximum of how much value of each tier score associated with each web document can change in this particular iteration of the optimizing algorithm. It will be apparent to persons skilled in the relevant art(s) that the example calculation of the learning rate is provided for illustrative purposes only and is not intended to be limiting.

In step [f] of the optimizing algorithm, the counter variable is incremented by one. It will be apparent to persons skilled in the relevant art(s) that the example use of the counter variable is provided for illustrative purposes only and is not intended to be limiting.

In step [g] of the optimizing algorithm, an objective function is used. The objective function may have two general terms: a worst web document determination and calculation of a general decrement for all other web documents. In one implementation, a tier score (x) associated with worst web document 418 is also modified in step [g] of the optimizing algorithm to indicate a higher priority cache. For example, the tier score (x) associated with worst web document 418 is modified by calculating [x−(η)(objective function (x))].

In one implementation, the general decrement is applied only to the resulting web documents 406 other than worst web document 418. In another implementation, the general decrement is applied to substantially all of the plurality of web documents (e.g., billions of possible web documents) other than worst web document 418. The objective function is discussed in more detail below. The objective function may determine worst web document 418. The objective function may calculate and apply a decrement to the tier score associated with each web document. In one implementation, the decrement may not be applied during execution of the objective function in step [g]. Instead, the decrement may be deferred, such as by increasing a cumulative deferred decrement associated with each of the web documents. In one implementation, each web document may have an associated data structure that can store the respective cumulative deferred decrement for that web document. In another implementation, each data structure may hold a cumulative deferred decrement for two or more web documents.

In step [h] of the optimizing algorithm, the modification of the tier score associated with worst web document 418 is checked and/or corrected by projecting the modification using the available number of the two or more caches. For example, in step [g] the tier score associated with worst web document 418 may indicate a cache that does not exist. In accordance with this example, in step [h] the tier score may be re-mapped to indicate an available cache.

In an example embodiment, the objective function used in step [g] of the optimization algorithm may be as follows:

$$l_q(z) = v_q \max_{d \in D_q} z_d + \dfrac{1}{|Q|} \sum_d f_\lambda(z_d)$$

In the above objective function, the first element of the equation, i.e., before the sum, is directed to determine the worst web document. For example, the max z$_d$ term of the first element may determine worst web document 418 out of the resulting plurality of web documents for query q. In one implementation, a tier score associated with worst web document 418 is also modified in step [g] of the optimizing algorithm to indicate a higher priority cache. In another implementation, the tier score associated with worst web document 418 is also modified by the objective function. Thus, the first element of the equation depends on the query q.

In the above objective function, the second element of the equation calculates a stochastic gradient, such as by using a stochastic gradient function, with respect to an access penalty for each of the web documents other than the worst web document. For example, the f(λ)(Z$_d$) term calculates an increasing decrement, which is lowest for a large Z and highest for a small Z, where (Z$_d$) is indicative of the retrieval cost (e.g., access time from caches 408) of web document d. The f(λ) term calculates a gradient with respect to Z that is used to calculate the decrement for each web document. In one implementation, the second element of the equation also applies the calculated decrement for each web document. As discussed, the decrement may be cumulated and deferred. Also, the second element of the objective function may be independent of the query q.

In one embodiment, the deferred cumulative optimization, such as used in step [g] of the optimization algorithm, may be performed using a deferred update algorithm. The deferred update algorithm may be as follows:

[a]     Observe current time n'
[b]     Read timestamp n for document d
[c]     Compute update steps δ = δ (n', n)
[e]     repeat
[f]         j = [ z$_d$ + 1 ]           // next largest tier
[g]         t = (j − z$_d$) / λ$_j$     // needed to reach next largest tier
[h]             if t > δ then

| [g] | | $\delta = 0$ | and | $z_d \leftarrow z_d + z_d + \lambda_j \delta$ | //partial step, done |
| --- | --- | --- | --- | --- | --- |
| [h] | | else | | | |
| [g] | | $\delta \leftarrow \delta - 1$ | and | $z_d \leftarrow z_d + 1$ | // full step, next tier |
| [i] | | end if | | | |
| [j] | until | $\delta = 0$ or $z_d = k - 1$ | | | // no more updates or bottom tier |

The deferred update algorithm thus keeps a score, such as by using a data structure described above, of how much each web document is penalized (i.e., by modifying tier scores associated with resulting web documents 406 other than worst web document 418 to indicate a lower priority cache). Instead of modifying tier scores associated with resulting web documents 406 other than worst web document 418 to indicate a lower priority cache when a decrement is determined, the deferred update algorithm may defer the actual decrement until later. The deferred update algorithm thus keeps a score, such as by using a data structure associated with each web document, to indicate each decrement, such as calculated in step [h] of the optimization algorithm. The deferred update algorithm may also keep track of a duration of time since the tier score associated with worst web document 418 was previously modified.

1. Cache Placement Module Embodiments

Figure 5:
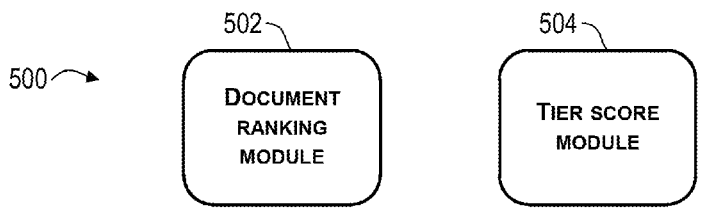
FIG. 5 is a block diagram of an example implementation of a cache placement module shown in FIG. 1 in accordance with an embodiment.

Cache placement module 118 of FIG. 1 may be implemented in various ways, in embodiments. For instance, FIG. 5 shows a block diagram of a cache placement module 500 in accordance with an embodiment. Cache placement module 500 is an example of cache placement module 118. Cache placement module 500 includes a document ranking module 502 and a tier ranking module 504. Cache placement module 500 is configured to modify a tier score associated with plurality of web documents of resulting web documents 406 resulting from each query, such as query 402B, of a plurality of queries 402, shown in FIG. 4.

In one example embodiment, document ranking module 502 is configured to determine a worst web document from resulting web documents 406. In one implementation, worst web document 418 may be positioned in one of caches 408 that has a highest access penalty relative to the access penalties for resulting web documents 406 other than the worst web document. For example, with reference to FIG. 4, web documents 0 and 4 are shown positioned in tier 3 cache 408C having highest access penalty. Document ranking module 502 may determine that web document 4 is worst web document 418 based on the tier scores for both web documents positioned in tier 3 cache 408C.

Tier score module 504 may be configured to modify a tier score associated with worst web document 418 to indicate a higher priority cache. A higher priority cache may have a lower access penalty relative to an access penalty for a lower priority cache. For example, cache placement module 500 may modify a tier score associated with worst web document 418 to indicate a higher priority cache. In other words, cache placement module 500 may modify the tier score associated with worst web document 418 to indicate worst web document 418 belonging to a higher priority cache.

In accordance with the example embodiment described above, tier score module 504 is further configured to modify tier scores associated with resulting web documents 406 other than worst web document 418 to indicate a lower priority cache. A lower priority cache has a higher access penalty relative to an access penalty for a higher priority cache. For example, cache placement module 500 may modify a tier score associated with resulting web documents 406 (e.g., web documents 412 and 414 and possibly web document 0) other than worst web document 418 to indicate a lower priority cache.

In one implementation, tier score module 504 is further configured to modify a tier score associated with the worst web document to indicate a higher priority cache by an amount allowed by a learning rate. The learning rate controls an allowed amount of change of a tier score in one iteration of the modification of a tier score associated with worst web document 418 to indicate a higher priority cache.

In one implementation, tier score module 504 is further configured to modify tier scores associated with resulting web documents 406 other than worst web document 418 to indicate a lower priority tier by an amount that is calculated based on previous actions taken with respect to the tier score associated with worst web document 418. The previous actions taken with respect to the tier score associated with worst web document 418 may include a duration of time since the tier score associated with worst web document 418 was previously modified. The previous actions taken with respect to the tier score associated with worst web document 418 also include a cumulative deferred decrement of the tier score associated with worst web document 418. The cumulative deferred decrement is indicative of previous deferred modifications of the tier score associated with worst web document 418 indicating a lower priority cache. Example types of previous actions taken with respect to the tier score associated with worst web document 418 are described below with respect to FIG. 6.

Figure 6:
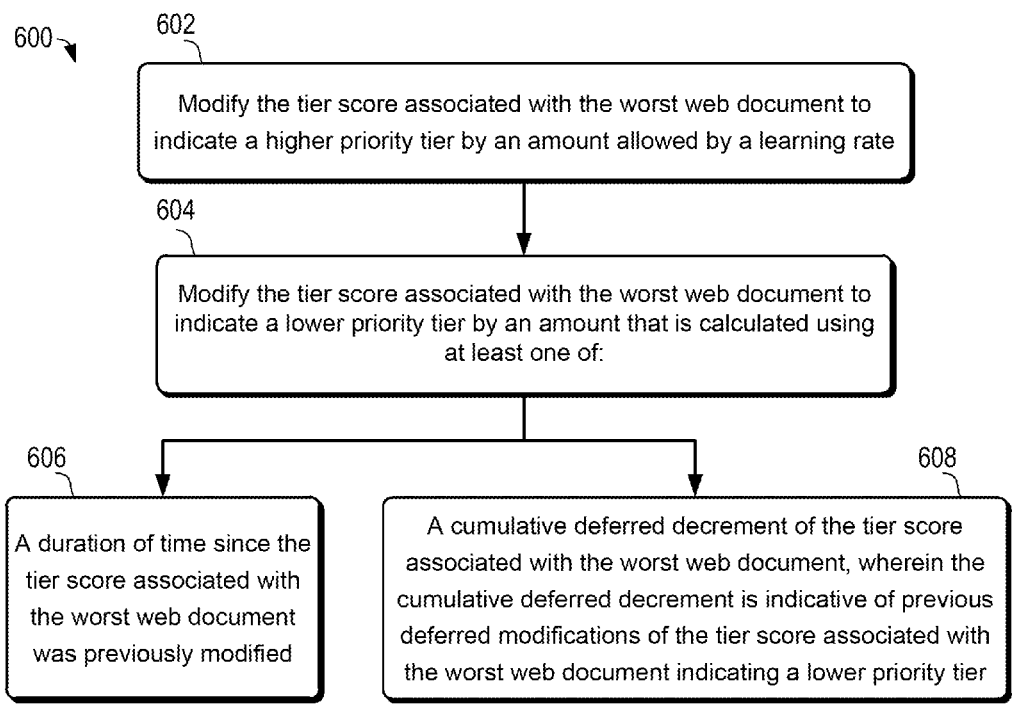
FIG. 6 depicts a flowchart of a method for modifying a tier score associated with a worst web document in accordance with an embodiment.

FIG. 6 depicts a flowchart 600 of a method for modifying a tier score associated with a worst web document, according to an example embodiment. In one example embodiment, instead of performing step 306 of flowchart 300, the steps shown in flowchart 600 may be performed. The method of flowchart 600 will be described in reference to system 100 of FIG. 1. However, it is noted that flowchart 600 is not limited to that implementation. Further structural and operational embodiments will be apparent to persons skilled in the relevant art(s) based on the following description of flowchart 600. Also, the method of flowchart 600 may be modified by those skilled in the art in order to derive additional alternative embodiment(s). Still further, the steps may occur in a different order than shown, some steps may be performed concurrently, some steps may be combined with other steps, and/or some steps may be absent, as desired. As shown in FIG. 6, the method of flowchart 600 begins at step 602.

In step 602, the tier score associated with the worst web document is modified to indicate a higher priority cache by an amount allowed by a learning rate. For instance, cache placement module 118 may modify the tier score associated with worst web document 418 by increasing the tier score associated with worst web document 418 by a first amount that is allowed by the learning rate.

In step 604, a tier score associated with the worst web document is modified to indicate a lower priority cache by an amount that is calculated using at least one of elements of steps 606 or 608 (also referred to herein as previous actions taken with respect to the tier score associated with worst web document 418). In one embodiment, cache placement module 118 modifies the tier score associated with worst web document 418 by decreasing the tier score associated with worst web document 418 (where a lower tier score is indicative of lower priority cache) by a second amount that is calculated based on previous actions taken with respect to the tier score associated with worst web document 418.

In other words, the tier score associated with worst web document 418 may be increased by the first amount in step 602 and decreased by the second amount in step 604. The previous actions taken with respect to the tier score associated with worst web document 418 may include modifications of the tier scores associated with the resulting web documents other than another worst web document to indicate a lower priority cache when obtaining the resulting web documents for another query of plurality of queries 402.

For example, with reference to FIG. 4, if query 402B results in resulting web documents 406 that includes worst web document 418 stored in tier 3 cache 408C, then previous actions taken with respect to the tier score associated with worst web document 418 (i.e., web document 4) may include modifications of the tier scores associated with web document 4 when processing pluralities of resulting web documents resulting from previous queries 402 and/or previous iterations. Query 402A may result in a previous resulting plurality of web documents that includes web document 4 as one of the resulting web documents other than another worst web document. Query 402A may result in different resulting web documents that have a different worst web document from worst web document 418 determined for query 402B. In other words, for query 402A the web document 4 may be one of the different resulting web documents other than the different worst web document that has its tier score modified to indicate a lower priority cache.

In step 606, the tier score associated with the worst web document is modified to indicate a lower priority cache by an amount that is calculated using at least a duration of time since the tier score associated with the worst web document was previously modified. In an example embodiment, cache placement module 118 modifies the tier score associated with worst web document 418 to indicate a lower priority cache by an amount that is calculated based on previous actions taken with respect to the tier score associated with worst web document 418 that includes a duration of time since the tier score associated with worst web document 418 was previously modified. In one implementation, tier scores of all of resulting web documents 406 other than worst web document 418 are decremented each time when the tier score associated with worst web document 418 is increased. In another implementation, tier scores of all of the plurality of web documents (e.g., billions of web documents) other than worst web document 418 are decremented each time when the tier score associated with worst web document 418 is increased. In both of these implementations, it may be impractical to access and decrement tier scores associated with the web documents other than worst web document 418.

A data structure may be associated with each web document, such as described above with reference to the optimizing algorithm. The data structure associated with each web document may include one or more of the tier score associated with that web document and a value indicative of the time the tier score associated with that web document was last modified (such as when the tier score was increased as described in step 602). In step 606 cache placement module 118 may access the data structure associated with worst web document 418 to determine a duration of time since the tier score associated with worst web document 418 was previously modified.

In step 608, the tier score associated with the worst web document is modified to indicate a lower priority cache by an amount that is calculated using at least a cumulative deferred decrement of the tier score associated with the worst web document, wherein the cumulative deferred decrement is indicative of previous deferred modifications of the tier score associated with the worst web document indicating a lower priority cache. In an example embodiment, cache placement module 118 modifies the tier score associated with worst web document 418 to indicate a lower priority cache by an amount that is calculated based on previous actions taken with respect to the tier score associated with worst web document 418 that includes a cumulative deferred decrement of the tier score associated with worst web document 418. In one implementation, each time cache placement module 118 modifies tier scores associated with web documents of the resulting plurality of web documents other than worst web document 418 to indicate a lower priority cache (such as described with respect to step 308), a cumulative deferred decrement of the tier score associated with each of the resulting web documents other than worst web document 418 is increased, such as by using a respective data structure for each web document, as described below with respect to FIG. 7.

Figure 7:
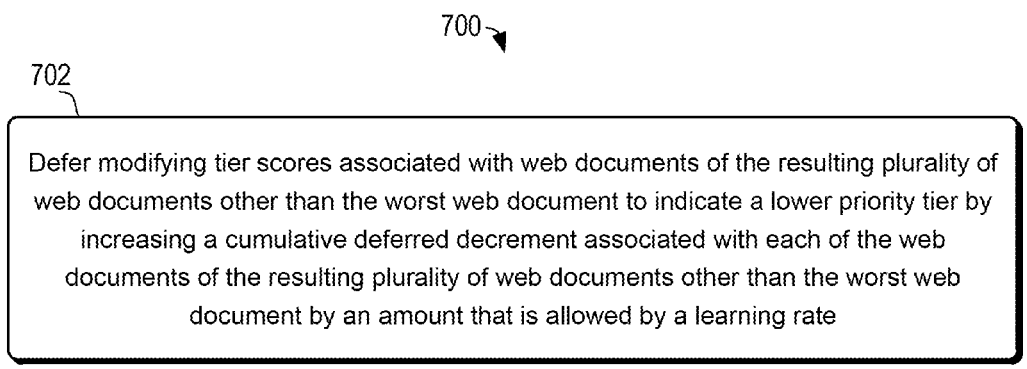
FIG. 7 depicts a flowchart of a method for modifying tier scores associated with web documents other than the worst web document in accordance with an embodiment.

Tier scores associated with web documents may be modified in a variety of ways according to embodiments. For instance, FIG. 7 depicts a flowchart 700 of a method for modifying tier scores associated with web documents other than worst web document, according to an example embodiment. In one example embodiment, instead of performing step 308 of flowchart 300, step 702 shown in FIG. 7 may be performed. Step 702 is described as follows with reference system 100. However, it is noted that the method is not limited to that implementation. Further structural and operational embodiments will be apparent to persons skilled in the relevant art(s) based on the following description of step 702. Also, step 702 may be modified by those skilled in the art in order to derive additional alternative embodiment(s).

In step 702, the modification of tier scores associated with web documents of the resulting plurality of web documents other than the worst web document to indicate a lower priority cache by increasing a cumulative deferred decrement associated with each of the web documents of the resulting plurality of web documents other than the worst web document by an amount that is allowed by a learning rate is deferred. For instance, cache placement module 118 may defer modifying tier scores associated with resulting plurality web documents 406 other than worst web document 418 to indicate a lower priority cache. The lower priority cache may be determined by increasing a cumulative deferred decrement associated with each resulting web documents 406 other than worst web document 418 by an amount that is allowed by the learning rate.

In one embodiment, each time cache placement module 118 modifies tier scores associated with resulting web documents 406 other than worst web document 418 to indicate a lower priority cache (such as described with respect to step 308), a cumulative deferred decrement of the tier score associated with each of resulting web documents 406 other than worst web document 418 is increased. Each of resulting web documents 406 may have an associated data structure that stores a respective tier score and/or a respective cumulative deferred decrement of the respective tier score.

In another embodiment, cache placement module 118 may defer modifying tier scores associated with the plurality of web documents (e.g., billions of web documents) other than worst web document 418 to indicate a lower priority cache. The cumulative deferred decrement associated with each of the plurality of web documents other than worst web document 418 may be increased by an amount that is allowed by a learning rate.

In one example implementation, each of the tiers of caches 120 may have a different associated amount that is decremented from a tier score associated with the corresponding web document. For example, with reference to FIG. 4, each of tiers of caches 408 may have a different associated decrement amount. Web documents 412 that are stored in tier 1 cache 408A may have a larger associated decrement amount than web documents 414 stored in tier 2 cache 408B.

Figure 8:
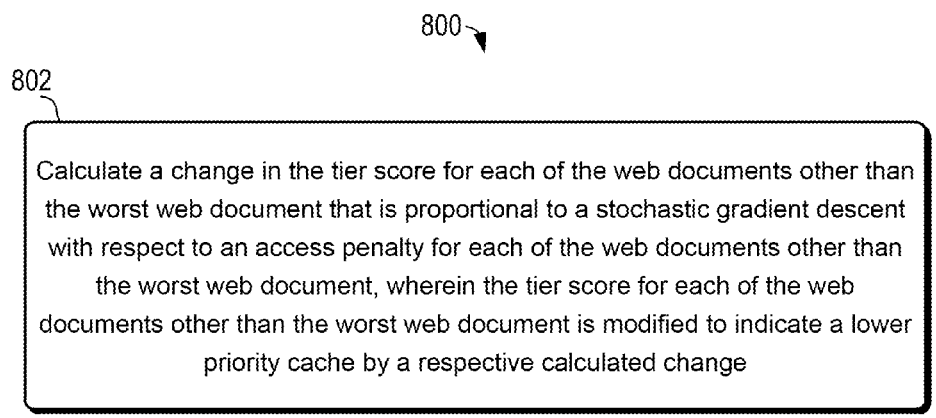
FIG. 8 depicts a flowchart of a method for calculating a change in score for web documents other than the worst web document in accordance with an embodiment.

Tier scores associated with web documents may be modified in a variety of ways according to embodiments. For instance, FIG. 8 depicts a flowchart 800 of a method for calculating a change in tier scores for web documents other than worst web document 418, according to an example embodiment. In one example embodiment, instead of performing step 308 of flowchart 300, step 802 shown in FIG. 8 may be performed. Step 802 is described as follows in reference to system 100 of FIG. 1. However, it is noted that the method is not limited to that implementation. Further structural and operational embodiments will be apparent to persons skilled in the relevant art(s) based on the following description of step 802. Also, step 802 may be modified by those skilled in the art in order to derive additional alternative embodiment(s). For example, in one embodiment, step 702 of FIG. 7 and step 802 of FIG. 8 may be combined.

In step 802, a change in the tier score for each of the web documents other than the worst web document that is proportional to a stochastic gradient descent with respect to an access penalty for each of the web documents other than the worst web document is calculated. In step 802, the tier score for each of the web documents other than the worst web document is modified to indicate a lower priority cache by a respective calculated change. For instance, cache placement module 118 may calculate a change in the tier score for each of the web documents other than worst web document 418 that is proportional to a stochastic gradient descent with respect to an access penalty for each of the web documents other than worst web document 418. For instance, cache placement module 118 may perform the calculation using a stochastic gradient function and/or an objective function. In one implementation, the tier score for each of the web documents (e.g., billions of web documents) other than worst web document 418 is modified to indicate a lower priority cache by a respective calculated change.

Figure 9:
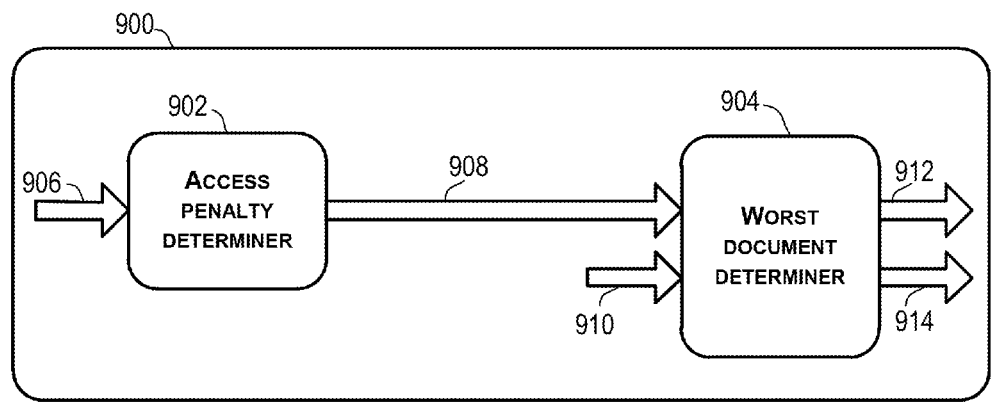
FIG. 9 is a block diagram of an example implementation of a document ranking module shown in FIG. 8 in accordance with an embodiment.

Embodiments for ranking of web documents may be implemented in a variety of ways. For instance, FIG. 9 shows a block diagram of a document ranking module 900, according to an example embodiment. Document ranking module 900 is an example of document ranking module 502 shown in FIG. 5. As shown in FIG. 9, document ranking module 900 includes an access penalty determiner 902 and a worst document determiner 904. These features of document ranking module 900 are described as follows.

Access penalty determiner 902 is configured to determine an access penalty for each web document of the resulting plurality of web documents. In one implementation, access penalty determiner 902 receives and processes web document data 906 regarding each web document to determine an access penalty 908 for each web document. For example, with reference to FIG. 4, access penalty determiner 902 may determine access penalty 908 for each resulting web document 406. In one implementation, each tier of caches 408 may have a different associated decrement amount. Access penalty determiner 902 may determine a smaller access penalty 908 for web documents 412 that are stored in tier 1 cache 408A, and a larger access penalty for each of web documents 414 stored in tier 2 cache 408B and/or for each of web documents 416 stored in tier 3 cache 408C.

Referring back to FIG. 9, worst document determiner 904 is configured to determine worst web document 418 that has a highest access penalty from the resulting plurality of web documents. In one embodiment, worst document determiner 904 may receive access penalties 908 generated by access penalty determiner 902 for each resulting web document 406 and determines which resulting web document has a worst associated access penalty (e.g., which web document has a highest access penalty). In one embodiment, worst document determiner 904 also may receive resulting web documents 910. As shown in FIG. 9, worst document determiner 904 may output a worst access penalty 912 of access penalties 908. For example, with reference to FIG. 4, worst document determiner 904 may determine a worst web document (e.g., one or both of web documents 0 and 4) by determining which of resulting web documents 406 has a worst access penalty 912. In an embodiment, worst document determiner 904 may output an indication of worst web document 914, including but not limited to outputting worst web document 914 out of resulting web documents 910.

Figure 10:
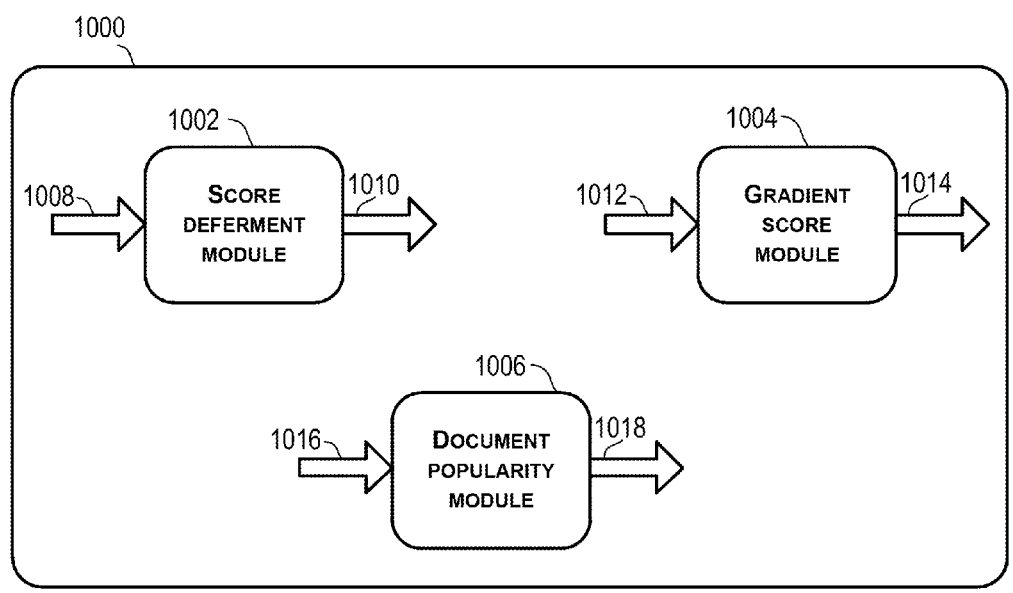
FIG. 10 is a block diagram of an example implementation of a tier score module shown in FIG. 8 in accordance with an embodiment.

Embodiments of a tier scoring module may be implemented in a variety ways. For instance, FIG. 10 is a block diagram of a tier score module 1000, according to an example embodiment. Tier score module 1000 is an example of tier score module 504 shown in FIG. 5. As shown in FIG. 10, tier score module 1000 includes a score deferment module 1002, a gradient score module 1004, and a document popularity module 1006. These features of tier score module 1000 are described as follows.

Score deferment module 1002 is configured to defer the modification of tier scores associated with the resulting web documents other than worst web document 418 to indicate a lower priority cache. The modification may be deferred by increasing a cumulative deferred decrement associated with each of the resulting plurality documents other than worst web document 418 by an amount that is allowed by the learning rate. As shown in FIG. 10, score deferment module 1002 may receive a data structure 1008, such as the data structure described above with reference to step 606 of flowchart 600 and the optimizing algorithm, associated with each of the resulting web documents other than worst web document 418. Each data structure may include data for a cumulative deferred decrement for each associated web document. Score deferment module 1002 is configured to increase a cumulative deferred decrement associated with each respective web document, such as by accessing and updating its respective data structure, by an amount that is allowed by the learning rate. As shown in FIG. 10, score deferment module 1002 generates an updated data structure 1010 associated with each web document of resulting web documents 406 other than worst web document 418.

Gradient score module 1004 is configured to calculate a change in the tier score for each of the web documents other than worst web document 418 that is proportional to a stochastic gradient descent with respect to an access penalty for each of the web documents other than worst web document 418. In one embodiment, gradient score module 1004 is configured to execute the objective function described above. In one embodiment, the tier score for each of the web documents other than worst web document 418 is modified to indicate a lower priority cache by a respective calculated change. In one implementation, gradient score module 1004 receives one or more inputs 1012 to a stochastic gradient function, such as calculated using the objective function. The one or more inputs 1012 may include substantially all of the plurality of queries, such as queries 402, as well as the worst web document, such as worst web document 418. The one or more inputs 1012 may also include one or more data structures associated with the plurality of documents and/or resulting web documents 406. In accordance with this implementation, gradient score module 1004 uses the stochastic gradient function (e.g., by using the optimizing algorithm and/or the objective function described above) to calculate a decrement, i.e., a tier score change 1014 for each of resulting web documents 406 other than worst web document 418.

Document popularity module 1006 is configured to assign one or more popular web documents to a highest cache tier. In one embodiment, the highest cache tier has an associated lowest access penalty of the caches. In one implementation, once document popularity module 1006 assigns one or more popular web documents to the highest cache tier, then these assigned popular web documents are not being operated on anymore by cache placement module 118. In one implementation, document popularity module 1006 receives one or more inputs 1016 that may include one or more indications of how frequent each web document comes up as a result of each query 402. In one implementation, document popularity module 1006 generates one or more outputs 1018 that may include an indication regarding a particular web document being assigned to a highest cache or a lowest cache, depending on the outcome of a determination made by document popularity module 1006.

For example, referring to FIG. 4, if one web document of resulting web documents 406 (e.g., web document 7) keeps coming up as a result of many queries 402 (such as more than a maximum threshold), then document popularity module 1006 may assign web document 7, as a popular web document, to the highest cache tier, e.g., tier 1 cache 408A. The maximum threshold may be dynamically determined by document popularity module 1006, or it may be pre-defined and/or input by an administrator of web search engine 106.

Document popularity module 1006 is further configured to assign one or more unpopular web documents to a lowest cache tier. In one embodiment, the lowest cache tier has an associated highest access penalty of the caches. In one implementation, once document popularity module 1006 assigns one or more unpopular web documents to the lowest cache, then these assigned unpopular web documents are not being operated on anymore by cache placement module 118.

For example, referring to FIG. 4, if one web document of the plurality of web documents (e.g., web document M, not shown) only comes up as a result of a few of plurality of queries 402 (such as less than a minimum threshold), then document popularity module 1006 may assign web document M, as an unpopular web document, to lowest cache tier, i.e., tier 3 cache 408C. The minimum threshold may be dynamically determined by document popularity module 1006, or it may be pre-defined and/or input by an administrator of web search engine 106.

However, the invention is not limited to such embodiments, and other means for caching web documents in two or more caches may be used.

C. Example Computer System Implementations

Figure 11:
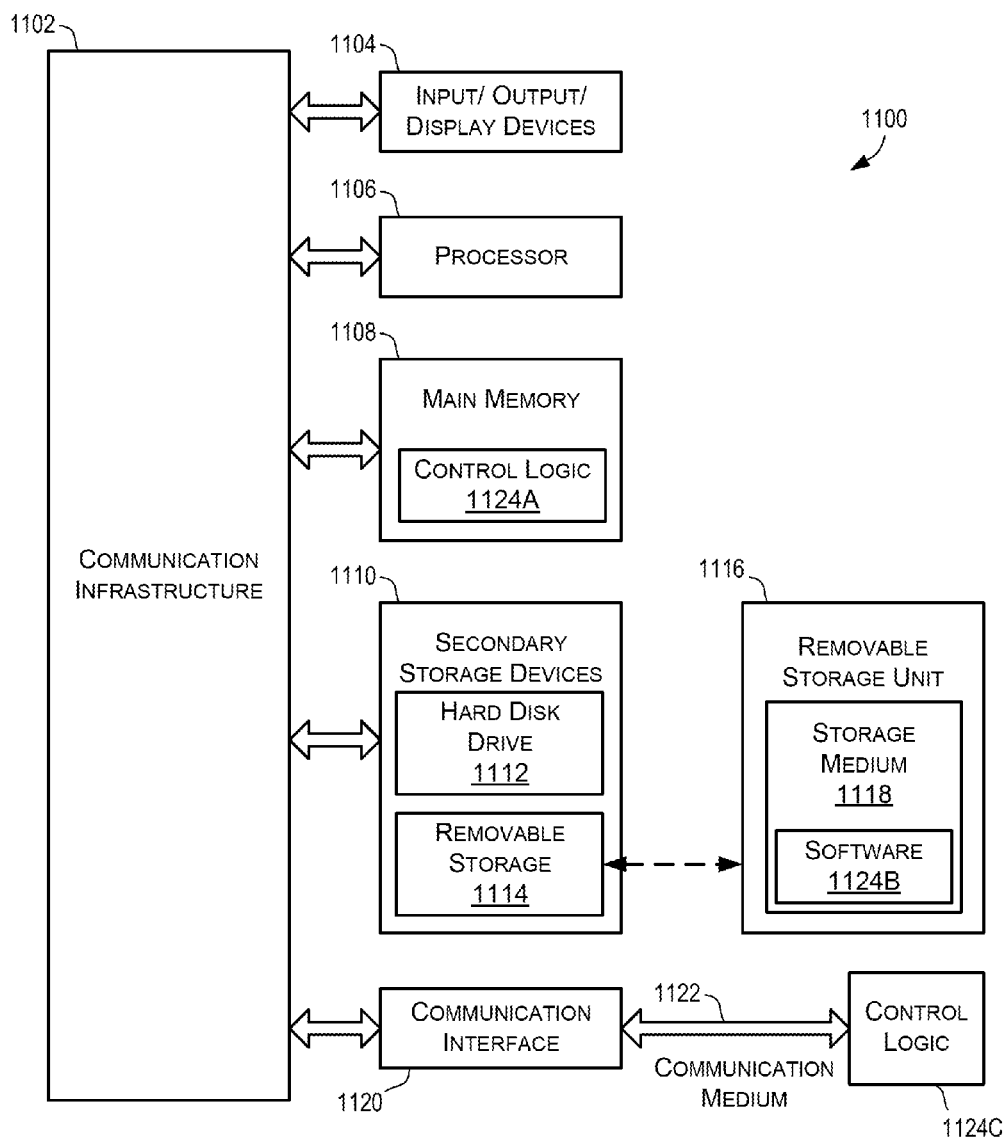
FIG. 11 is a block diagram of an example computer system in which embodiments may be implemented.

The embodiments described herein, including systems, methods/processes, and/or apparatuses, may be implemented using well known servers/computers, such as computer 1100 shown in FIG. 11. For example, tiered storage module 116, cache placement module 118, caches 120, cache placement module 500, document ranking module 502, tier score module 504, document ranking module 900, access penalty determiner 902, worst document determiner 904, tier score module 1000, score deferment module 1002, gradient score module 1004, document popularity 1006, flowchart 300, flowchart 600, step 702, and step 802 can be implemented using one or more computers 1100.

Computer 1100 can be any commercially available and well known computer capable of performing the functions described herein, such as computers available from International Business Machines (IBM®), Apple®, Sun®, HP®, Dell®, Cray®, etc. Computer 1100 may be any type of computer, including a desktop computer, a server, etc.

Computer 1100 includes one or more processors (also called central processing units, or CPUs), such as a processor 1106. Processor 1106 is connected to a communication infrastructure 1102, such as a communication bus. In some embodiments, processor 1106 can simultaneously operate multiple computing threads.

Computer 1100 also includes a primary or main memory 1108, such as random access memory (RAM). Main memory 1108 has stored therein control logic 1124A (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1124B (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well known manner.

Computer 1100 further includes a communication or network interface 1120. Communication interface 1120 enables computer 1100 to communicate with remote systems and devices. For example, communication interface 1120 allows computer 1100 to communicate over communication networks or mediums 1122, such as LANs, WANs, the Internet, etc. Network interface 1120 may interface with remote sites or networks via wired or wireless connections.

Control logic 1124C may be transmitted to and from computer 1100 via the communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules (control logic) that include computer program logic for tiered storage 116, cache placement module 118, caches 120, cache placement module 500, document ranking module 502, tier score module 504, document ranking module 900, access penalty determiner 902, worst document determiner 904, tier score module 1000, score deferment module 1002, gradient score module 1004, document popularity 1006, flowchart 300, flowchart 600, step 702, and step 802 (including any one or more steps of flowcharts 300 and 600), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for caching web documents in two or more caches, the method comprising: for each query of a plurality of queries, where each query results in a plurality of web documents, each of the web documents of the resulting plurality of web documents having a corresponding tier score indicative of a position of the corresponding web document in the two or more caches,
    modifying tier scores of the resulting plurality of web documents by:
    determining an access penalty for each web document of the resulting plurality of web documents;
    determining a worst web document from the resulting plurality of web documents,
    the worst web document positioned in a cache of the two or more caches that has a highest access penalty relative to the access penalties for web documents of the resulting plurality of web documents other than the worst web document;
    modifying a tier score associated with the worst web document to indicate a higher priority cache, a higher priority cache having a lower access penalty relative to an access penalty for a lower priority cache;
    and modifying tier scores associated with web documents of the resulting plurality of web documents other than the worst web document to indicate a lower priority cache, a lower priority cache having a higher access penalty relative to an access penalty for a higher priority cache;
    wherein said modifying a tier score associated with the worst web document to indicate a higher priority cache further comprises:
        modifying the tier score associated with the worst web document to indicate a lower priority cache by an amount that is calculated using at least one of:
            a duration of time since the tier score associated with the worst web document was previously modified; and
            a cumulative deferred decrement of the tier score associated with the worst web document, wherein the cumulative deferred decrement is indicative of previous deferred modifications of the tier score associated with the worst web document indicating a lower priority cache.

2. The method of claim 1, wherein said modifying a tier score associated with the worst web document to indicate a higher priority cache comprises:
    modifying the tier score associated with the worst web document to indicate a higher priority cache by an amount allowed by a learning rate, wherein the learning rate controls an allowed amount of change of a tier score in one iteration of said modifying a tier score associated with the worst web document to indicate a higher priority cache.

3. The method of claim 1, wherein said modifying tier scores associated with web documents of the resulting plurality of web documents other than the worst web document to indicate a lower priority cache comprises:
    deferring said modifying tier scores associated with web documents of the resulting plurality of web documents other than the worst web document to indicate a lower priority cache by increasing a cumulative deferred decrement associated with each of the web documents of the resulting plurality of web documents other than the worst web document by an amount that is allowed by a learning rate, wherein the learning rate controls an allowed amount of change of a tier score in one iteration of said modifying tier scores associated with web documents of the resulting plurality of web documents other than the worst web document to indicate a lower priority cache.

4. The method of claim 1, wherein said modifying tier scores associated with web documents of the resulting plurality of web documents other them the worst web document to indicate a lower priority cache comprises:
    calculating a change in the tier score for each of the web documents other than the worst web document that is proportional to a stochastic gradient descent with respect to an access penalty for each of the web documents other than the worst web document, wherein the tier score for each of the web documents other than the worst web document is modified to indicate a lower priority cache by a respective calculated change.

5. The method of claim 1, further comprising:
    assigning one or more popular web documents to a highest of the two or more caches, wherein the highest of the two or more caches has an associated lowest access penalty of the two or more caches; and
    not performing said modifying tier scores of the resulting plurality of web documents for the one or more popular web documents after said assigning one or more popular web documents to a highest of the two or more caches.

6. The method of claim 1, further comprising:
    assigning one or more unpopular web documents to a lowest of the two or more caches, wherein the lowest of the two or more caches has an associated highest access penalty of the two or more caches; and
    not performing said modifying tier scores of the resulting plurality of web documents for the one or more unpopular web documents after said assigning one or more unpopular web documents to a lowest of the two or more caches.

7. The method of claim 1, further comprising:
performing said modifying tier scores of the resulting plurality of web documents for a number of iterations; and
decreasing a learning rate associated with said modifying tier scores of the resulting plurality of web documents proportionally with each iteration of the number of iterations wherein the learning rate controls an allowed amount of change of a tier score in the each iteration of said modifying a tier score associated with the worst web document to indicate a higher priority cache.

8. The method of claim 1, wherein said modifying a tier score associated with the worst web document to indicate a higher priority cache comprises incrementing the tier score associated with the worst web document;
wherein said modifying tier scores associated with web documents of the resulting plurality of web documents other than the worst web document to indicate a lower priority cache comprises decrementing the tier scores for web documents of the resulting plurality of web documents other than the worst web document;
wherein incrementing the tier score associated with the worst web document operates to change a position of the worst web document in the two or more caches to have a lower access penalty associated with the worst web document; and
wherein decrementing the tier scores for web documents of the resulting plurality of web documents other than the worst web document operates to change a position of a respective web document in the two or more caches to have a higher access penalty associated with the respective web document.

9. The method of claim 1,
wherein said modifying a tier score associated with the worst web document to indicate a higher priority cache comprises decrementing the tier score associated with the worst web document;
wherein said modifying tier scores associated with web documents of the resulting plurality of web documents other than the worst web document to indicate a lower priority cache comprises incrementing the tier scores for web documents of the resulting plurality of web documents other than the worst web document;
wherein decrementing the tier score associated with the worst web document operates to change a position of the worst web document in the two or more caches to have a higher access penalty associated with the worst web document; and
wherein incrementing the tier scores for web documents of the resulting plurality of web documents other than the worst web document operates to change a position of a respective web document in the two or more caches to have a lower access penalty associated with the respective web document.

10. A system having a memory device and a processor for caching web documents, the system comprising:
two or more caches implemented on the memory device and configured to store a plurality of web documents, each of the plurality of web documents having an associated tier score indicative of a position of a corresponding web document in the two or more caches; and
a cache placement module implemented on the processor and configured to modify a tier score associated with plurality of web documents resulting from each query of a plurality of queries, the cache placement module comprising:
a document ranking module comprising:
an access penalty determiner configured to determine an access penalty for each web document of the resulting plurality of web documents and
a worst document determiner configured to determine a worst web document from the resulting plurality of web documents, the worst web document positioned in a cache of the two or more caches that has a highest access penalty relative to the access penalties for web documents of the resulting plurality of web documents other than the worst web document; and
a tier score module configured to:
modify a tier score associated with the worst web document to indicate a higher priority cache, a higher priority cache having a lower access penalty relative to an access penalty for a lower priority cache; and
modify tier scores associated with web documents of the resulting plurality of web documents other than the worst web document to indicate a lower priority cache, a lower priority cache having a higher access penalty relative to an access penalty for a higher priority cache;
wherein the tier score module is further configured to:
modify tier scores associated with web documents of the resulting plurality of web documents other than the worst web document to indicate a lower priority tier by an amount that is calculated using at least one of:
a duration of time since the tier score associated with the worst web document was previously modified; and
a cumulative deferred decrement of the tier score associated with the worst web document, wherein the cumulative deferred decrement is indicative of previous deferred modifications of the tier score associated with the worst web document indicating a lower priority cache.

11. The system of claim 10, wherein the tier score module is further configured to:
modify the tier score associated with the worst web document to indicate a higher priority cache by an amount allowed by a learning rate, wherein the learning rate controls an allowed amount of change of a tier score in one iteration of the modification of a tier score associated with the worst web document to indicate a higher priority cache.

12. The system of claim 10, wherein the tier score module includes a score deferment module, the score deferment module being configured to defer the modification of tier scores associated with web documents of the resulting plurality of web documents other than the worst web document to indicate a lower priority cache by increasing a cumulative deferred decrement associated with each of the web documents of the resulting plurality of web documents other than the worst web document by an amount that is allowed by a learning rate, wherein the learning rate controls an allowed amount of change of a tier score in one iteration of the modification of tier scores associated with web documents of the resulting plurality of web documents other than the worst web document to indicate a lower priority cache.

13. The system of claim 10, wherein the tier score module includes a gradient score module, the gradient score module being configured to calculate a change in the tier score for each of the web documents other than the worst web document that is proportional to a stochastic gradient descent with respect to an access penalty for each of the web documents other than the worst web document, wherein the tier score for each of the web documents other than the worst web document is modified to indicate a lower priority cache by a respective calculated change.

14. The system of claim 10, wherein the tier score module includes a document popularity module, the document popularity module being configured to:
   assign one or more popular web documents to a highest of the two or more caches, wherein the highest of the one or more caches has an associated lowest access penalty of the two or more caches.

15. The system of claim 10, wherein the tier score module includes a document popularity module the document popularity module being configured to:
   assign one or more unpopular web documents to a lowest of the two or more caches, wherein the lowest of the two or more caches has an associated highest access penalty of the two or more caches.

16. A non-transitory computer-readable medium having computer program logic recorded thereon for caching web documents in two or more caches, the computer program logic, when executed, perforating a method, comprising:
   enabling a processor to determine an access penalty for each web document of the resulting plurality of web documents;
   enabling the processor to modify a tier score associated with one or more web documents resulting from each query of a plurality of queries, the two or more caches configured to store a plurality of web documents, each of the plurality of web documents having an associated tier score indicative of a position of a corresponding web document in the two or more caches;
   enabling the processor to determine a worst web document from the resulting one or more web documents, the worst web document positioned in a cache of the two or more caches that has a highest access penalty relative to the access penalties for web documents of the resulting one or more web documents other than the worst web document; and
   enabling the processor to modify a tier score associated with the worst web document to indicate a higher priority cache, a higher priority cache having a lower access penalty relative to an access penalty for a lower priority cache, and for enabling a processor to modify tier scores associated with web documents of the resulting plurality of web documents other than the worst web document to indicate a lower priority cache, a lower priority cache having a higher access penalty relative to an access penalty for a higher priority cache;
   wherein said enabling the processor to modify a tier score associated with the worst web document to indicate a higher priority cache further comprises:
      enabling the processor to modify the tier score associated with the worst web document to indicate a lower priority cache by an amount that is calculated using at least one of:
         a duration of time since the tier score associated with the worst web document was previously modified; and
         a cumulative deferred decrement of the tier score associated with the worst web document, wherein the cumulative deferred decrement is indicative of previous deferred modifications of the tier score associated with the worst web document indicating a lower priority cache.

17. The method of claim 1, further comprising:
   generating a copy of the two or more caches, wherein modifying the tier scores of the resulting plurality of web documents is performed on the copy of the two or more caches.

18. The method of claim 17, further comprising:
   swapping the copy of the two or more caches and the two or more caches after modifying of the tier scores of the resulting plurality of web documents is performed on the copy of the two or more caches.

* * * * *